(12) United States Patent
Winterer et al.

(10) Patent No.: US 6,201,467 B1
(45) Date of Patent: Mar. 13, 2001

(54) PRESSURE SENSOR COMPONENT AND PRODUCTION METHOD

(75) Inventors: Jürgen Winterer, Nürnberg; Eric Bootz, Kelheim; Bernd Stadler, Donaustauf; Achim Neu, Regensburg; Thies Janczek, Flintbek, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/382,530

(22) Filed: Aug. 25, 1999

Related U.S. Application Data

(63) Continuation of application No. PCT/DE98/00409, filed on Feb. 12, 1998.

(30) Foreign Application Priority Data

Feb. 25, 1997 (DE) .............................. 197 07 503

(51) Int. Cl.[7] .................................................. H01C 10/10
(52) U.S. Cl. ............................ 338/42; 338/36; 257/417; 73/721; 73/727
(58) Field of Search ................................ 338/36, 37, 42; 257/417; 73/721, 727

(56) References Cited

U.S. PATENT DOCUMENTS

| 4,656,454 | * | 4/1987 | Rosenberger | 338/2 |
|---|---|---|---|---|
| 4,680,569 | | 7/1987 | Yamaki et al. | |
| 5,001,934 | * | 3/1991 | Tuckey | 73/721 |
| 5,184,107 | * | 2/1993 | Maurer | 338/42 |
| 5,341,684 | * | 8/1994 | Adams et al. | 73/721 |
| 5,629,538 | * | 5/1997 | Lipphardt et al. | 257/419 |
| 5,895,859 | * | 4/1999 | Sawada et al. | 338/2 |

FOREIGN PATENT DOCUMENTS

| 4203832C2 | 6/1996 | (DE) . |
|---|---|---|
| 0386959A2 | 9/1990 | (EP) . |
| 0436158A2 | 7/1991 | (EP) . |
| 0497534A2 | 8/1992 | (EP) . |
| 0690297A1 | 1/1996 | (EP) . |

OTHER PUBLICATIONS

Japanese Patent Abstract No. 4–122830 (Sekiyama), dated Apr. 23, 1992.

* cited by examiner

*Primary Examiner*—Karl D. Easthom
(74) *Attorney, Agent, or Firm*—Herbert L. Lerner; Laurence A. Greenberg; Werner H. Stemer

(57) ABSTRACT

The pressure sensor component has a chip carrier with an approximately planar chip carrier surface. A semiconductor chip with an integrated pressure sensor is placed on the chip carrier surface. A pressure-detecting surface area of the pressure sensor is exposed to a pressure to be measured. The component is encapsulated with electrically insulating material that encloses the semiconductor chip and/or the chip carrier at least in regions. A chimney-shaped connection piece that projects up relative to the pressure-detecting area of the pressure sensor penetrates through the encapsulation and is connected to the pressure sensor. The connection piece, which is a separate structural element is incorporated in the component encapsulation and it encloses at least the pressure-detecting surface area in a pressure-tight manner with its end bearing on the semiconductor chip. The connection piece is open toward the outside at its opposite end so as to expose the pressure sensor to the pressure to be measured. The invention furthermore relates to a method for producing such a pressure sensor component.

11 Claims, 1 Drawing Sheet

PRESSURE SENSOR COMPONENT AND PRODUCTION METHOD

CROSS-REFERENCE TO RELATED APPLICATION

This is a continuation of copending International Application PCT/DE98/00409, filed Feb. 12, 1998, which designated the United States.

BACKGROUND OF THE INVENTION

FIELD OF THE INVENTION

The invention relates to a pressure sensor component having a chip carrier with a substantially planar chip carrier surface and a semiconductor chip on the chip carrier surface. The semiconductor chip has an integrated a pressure sensor with a pressure-detecting area exposed to the pressure to be measured. The device has a component encapsulation made of an electrically insulating material enclosing the semiconductor chip and/or the chip carrier at least in regions. The invention furthermore relates to a method for producing such a pressure sensor component.

In order to measure pressures, the medium to be measured must be brought up to the sensor, or the pressure prevailing in the medium must be transmitted to the sensor. On the other hand, the application of a semiconductor pressure sensor in the final use requires that the sensor chip be provided with a protective encapsulation by being covered with a suitable material, normally plastic. What is known in this case is the application of the semiconductor chip, usually resting on silicon as the base material, in a housing, for example DIP housing (Dual Inline Package housing), SMD housing (Surface Mounted Design housing), or else in special designs, the housing subsequently being mounted on a printed circuit board.

In one prior art embodiment, the pressure coupling is effected by means of a diaphragm which covers and thus protects the sensitive sensor, is made of metal or else plastic and can also be embodied as a separate additional structural part. Problems frequently arise in that case because pressure is coupled in only insufficiently through the housing as far as the sensor chip with the sensor simultaneously being protected. What is required, in general, is a tight connection between the medium to be measured and the sensor, which connection is simple to produce, in order to avoid extraneous air flowing in which could falsify the pressure measurement. On the other hand, in many cases there is, moreover, a requirement to separate the medium to be measured from the metallic constituents of the sensor and also from the semiconductor chip, in order to avoid the risk of corrosion or destructive influence by the medium on the sensitive constituents of the sensor. Other embodiments of known pressure sensor components provide an open housing in which the protection of the sensor chip against environmental influences is regarded only as a problem of secondary importance, and the sensor chip is not protected. Such designs are generally suitable only for non-aggressive media.

European published patent application EP 0 436 158 A2 describes a solid-state pressure sensor comprising a pressure space which is open toward two opposite sides and also comprises a distortion sensor element formed by a silicon diaphragm. Each partial space of the pressure space thereby forms a hermetically sealed, separate space with the connection. The arrangement is furthermore encapsulated by a housing which, with O-rings, seals the connection flanges penetrating through the housing. The measurement principle is in this case based on the flexure of the silicon diaphragm which is picked up by sensor elements applied on the diaphragm.

European published patent application EP A 0 690 297 A1 describes a housing for electronic components and the production thereof, in which a pressure inlet opening is formed in the upper region of the encapsulation housing. The opening forms a connection piece in a chimney-shaped manner and is designed to be integral with the encapsulation housing. U.S. Pat. No. 4,680,569 describes a semiconductor pressure sensor with a semiconductor diaphragm chip whose pressure-detecting area is connected in a pressure-tight manner to the housing exterior via chimney-shaped connection penetrating through the housing.

It is common to all the previously known configurations of semiconductor pressure sensors that their production always necessitates a multistage process for covering or encapsulating the component, by means of which process the component is brought to its desired design.

SUMMARY OF THE INVENTION

It is accordingly an object of the invention to provide a pressure sensor component and production method, which overcomes the above-mentioned disadvantages of the heretofore-known devices and methods of this general type and in which the semiconductor chip carrying the mechanically sensitive pressure sensor, and/or the chip carrier, can be encapsulated more simply in structural terms and thus more cost-effectively and which, furthermore, assures that the connection between the medium to be measured and the pressure sensor is comparatively simple to establish but is nevertheless sufficiently tight.

With the foregoing and other objects in view there is provided, in accordance with the invention, a pressure sensor component, comprising:

- a chip carrier formed with a substantially planar chip carrier surface;
- a semiconductor chip disposed on the chip carrier surface, the semiconductor chip having an integrated pressure sensor with a pressure-detecting surface exposed to a pressure to be measured;
- a component encapsulation of electrically insulating material at least partly enclosing one of the semiconductor chip and the chip carrier; and
- a chimney-shaped connection piece incorporated into the component encapsulation for exposing the pressure-detecting surface to the pressure to be measured, the connection piece having an end bearing on the semiconductor chip and pressure-tightly enclosing the pressure-detecting surface, projecting away from the pressure-detecting surface of the pressure sensor, and penetrating through the component encapsulation.

In other words, the invention provides for a chimney-shaped connection piece, which projects up relative to the pressure-detecting surface area of the pressure sensor, penetrates through the encapsulation and is connected to the pressure sensor. The connection piece is to be arranged or incorporated in the component encapsulation, it encloses at least the pressure-detecting area in a pressure-tight manner with its end bearing on the semiconductor chip, and it is open toward the outside at its opposite end.

As will be seen from the following description, the method of producing the pressure sensor component provides for a chimney-shaped connection piece to be placed onto the pressure sensor after the mounting and contact-making of the semiconductor chip on the chip carrier but still prior to the encapsulation of the pressure sensor.

According to an essential concept of the invention, provision is made, as it were, of complete integration of an opening in the housing in the form of a chimney-shaped connection piece which is preferably formed as an independent structural part. Only the pressure-sensitive surface (the pressure-detecting surface area) of the semiconductor chip remains free. The remaining constituents or regions of the semiconductor chip are covered with encapsulation material, in particular molding compound. The opening in the component lies above the pressure-sensitive area of the semiconductor chip, in order to make it possible to sense different pressures at this point. The actual encapsulation of the pressure sensor component, that is to say the covering of the chip carrier, the rest of the semiconductor chip and, if appropriate, bonding wires, leads to the desired protection of the pressure sensor component against environmental influences and enables the application and use of the pressure sensor for example in the context of mounting on a printed circuit board. Consequently, an essential advantage of the solution according to the invention resides in targeted pressure coupling using an opening in conjunction with the sealing of the component with molding compound.

In accordance with an added feature of the invention, the pressure to be measured is passed via an opening formed in the chimney-shaped connection piece directly onto the pressure-detecting surface of the semiconductor chip.

The pressure to be measured is passed via the opening in the chimney-shaped connection piece directly onto the pressure-detecting area of the semiconductor chip. In this case, there is no need for a diaphragm in the sense of the previously known pressure sensor components, as is provided for measuring the pressure of aggressive media; if need be, the sensor surface can be passivated with a thin photoresist layer or similar thin protective layer and, in this way, be resistant to harmful environmental influences. In this way, the pressure sensor component according to the invention is suitable as a media-separated pressure sensor for more aggressive media as well. The remaining chip surface need not necessarily be passivated, and contact can thus be made with it using standard parameters.

In accordance with an additional feature of the invention, the chimney-shaped connection piece is formed by a structural part independent from and incorporated in the component encapsulation. In a preferred embodiment, the chimney-shaped connection piece is a one-piece plastic structure.

In accordance with another feature of the invention, a segment of the chimney-shaped connection piece completely within the component encapsulation includes an anchoring member for absorbing tensile forces acting on the chimney-shaped connection piece.

In accordance with a further feature of the invention, the anchoring member is a shaped part formed laterally on and projecting transversely with respect to a longitudinal direction of the connection piece.

In accordance with again an added feature of the invention, the anchoring member is a flange with a peripheral abutment area on an outer circumference of the end of the connection piece facing the semiconductor chip, the abutment area being supported on the semiconductor chip.

In this case, a section of the chimney-shaped connection piece which lies completely within the component encapsulation has an anchoring member, which takes up tensile forces acting on the chimney-shaped connection piece. The anchoring member of the chimney-shaped connection piece can thereby be formed by a shaped part which is arranged on the edge side and protrudes transversely with respect to the longitudinal direction. Furthermore, the flange shape of the anchoring member of the chimney-shaped connection piece is advantageously formed as a flange with the peripheral abutment area on the outer circumference of the end facing the semiconductor chip. The abutment area is supported on the semiconductor chip. The anchoring member is primarily necessary in the case where a pressure line that can be connected to the chimney-shaped connection piece is used. Specifically, when the pressure line is pulled off from the connection piece, tensile forces can act on the connection piece embedded within the molding compound. Such forces can lead to the connection piece being pulled out from the component housing, which results in the destruction of the pressure sensor component. This is avoided by virtue of the anchoring member.

In accordance with again an additional feature of the invention, the connection piece has a free end with an opening projecting beyond a structural height of the component, the free end of the connection piece having a support for a positively locking mechanical, play-free connection to a holder of a pressure line adapted to be placed onto the connection piece, such that, when the pressure line is placed onto the connection piece, the holder and the support engage with one another.

In accordance with again another feature of the invention, the connection piece has an outwardly tapering cross-sectional form.

These features are particularly advantageous for the purpose of connecting to a pressure line or a pressure hose in which the medium to be measured is brought up to the pressure sensor. A pressure line can be connected simply by being pushed on. In addition, the conically tapering construction gives rise to a design which is favorable because it enables simple release from the mold after the production of the connection piece by means of injection molding and is therefore favorable. Furthermore, it may advantageously be provided that the chimney-shaped connection piece arranged in the component encapsulation projects with its opening beyond the structural height of the component and is equipped at its free end with a supporting means for a positively locking mechanical, play-free connection to a holding means of a pressure line that can be placed onto the connection piece, in such a way that when the pressure line is placed onto the connection piece, the holding means and the supporting means alternately engage with one another.

In accordance with again a further feature of the invention, the connection piece is formed with a tubular attachment having a circular cross section and tapering conically toward a free end distal from the semiconductor chip, and with a baseplate at the end facing the semiconductor chip, the tubular attachment merging into the baseplate and the baseplate forming an anchoring member dimensioned and shaped to match the pressure-detecting surface of the semiconductor chip.

In accordance with a concomitant feature of the invention, the chip carrier includes a plurality of surface-mountable electrode connections electrically connected to the pressure sensor and to an electronic circuit of the semiconductor chip assigned to the pressure sensor, the electrode connections penetrating through the component encapsulation.

With the above and other objects in view there is also provided, in accordance with the invention, a method of producing a pressure sensor component with a chip carrier having a substantially planar chip carrier surface and a semiconductor chip with an integrated pressure sensor on the chip carrier surface, which comprises the following steps:

mounting and contacting a semiconductor chip with a pressure sensor on a substantially planar chip carrier surface of a chip carrier;

placing a chimney-shaped connection piece onto the semiconductor chip to project upward from a pressure-detecting surface of the pressure sensor and to expose the pressure-detecting surface to a pressure to be measured, and pressure-tightly enclosing at least the pressure-detecting surface of the pressure sensor with an end of the connection piece bearing on the semiconductor chip; and encapsulating the pressure sensor component with a component encapsulation of an electrically insulating material, the component encapsulation enclosing one of the semiconductor chip and the chip carrier and enclosing a portion of the connection piece.

In accordance with yet an additional mode of the invention, the placing step comprises permanently affixing the chimney-shaped connection piece on the semiconductor chip, in particular by adhesive bonding or bonding, prior to encapsulation.

In accordance with yet a concomitant mode of the invention, the encapsulating step comprises injection molding the semiconductor pressure sensor on the chip carrier and with the chimney-shaped connection piece in place.

In the simplest case, the chimney-shaped connection piece is simply placed onto the semiconductor chip prior to encapsulation, the subsequent injection molding process for completing the encapsulation by means of a molding compound, in particular a thermosetting plastic or thermoplastic molding compound, ensuring a sufficiently pressure-tight connection of the connection piece on the semiconductor chip. As an alternative, the chimney-shaped connection piece can also be permanently fixed, prior to encapsulation, on the semiconductor chip, in particular by means of adhesive bonding or bonding, in the latter case the connection piece being composed of a metallic material or being coated with a metal layer, and, moreover, being produced from a plastic material which, in particular, is stable at high temperature.

For the encapsulation and thus protection of the contact-connected semiconductor chip, use is preferably made of a process of encapsulation by injection molding using heat-curing thermosetting plastics, as is inherently used for standard components. In this case, the molding compound performs the task not only of protecting the semiconductor chip but also of mechanizing the chip carrier and the chimney-shaped connection piece, and provides for a reproducible, defined housing form. As is customary in the case of transfer molding using thermosetting plastics, the quantity of plastic required for a molding process is heated at one location and plasticized and from there is pressed by a plunger through ducts into the closed mold with the component to be encapsulated, where it cures and can then be removed as a finished product. Suitable plastics for the encapsulation by injection molding include, in addition to thermosetting plastics (epoxy or silicon molding compounds), in particular thermoplastics, which have advantages with regard to economical and automated production.

Suitable housing designs for the pressure sensor component according to the invention are both those for plug-in mounting and those for surface mounting. In the case of plug-in mounting, as is known, the connections of the component are plugged into the holes in a printed circuit board and then soldered on the opposite side. By contrast, in the case of surface mounting, the component connections are no longer plugged into holes in the printed circuit board but rather are placed onto pads on the printed circuit board and soldered there. Surface mounting makes it possible to save a considerable amount of space and to reduce costs; for this reason, this type of mounting is preferred in the case of the pressure sensor component according to the invention as well.

Other features which are considered as characteristic for the invention are set forth in the appended claims.

Although the invention is illustrated and described herein as embodied in a pressure sensor component and method for producing it, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
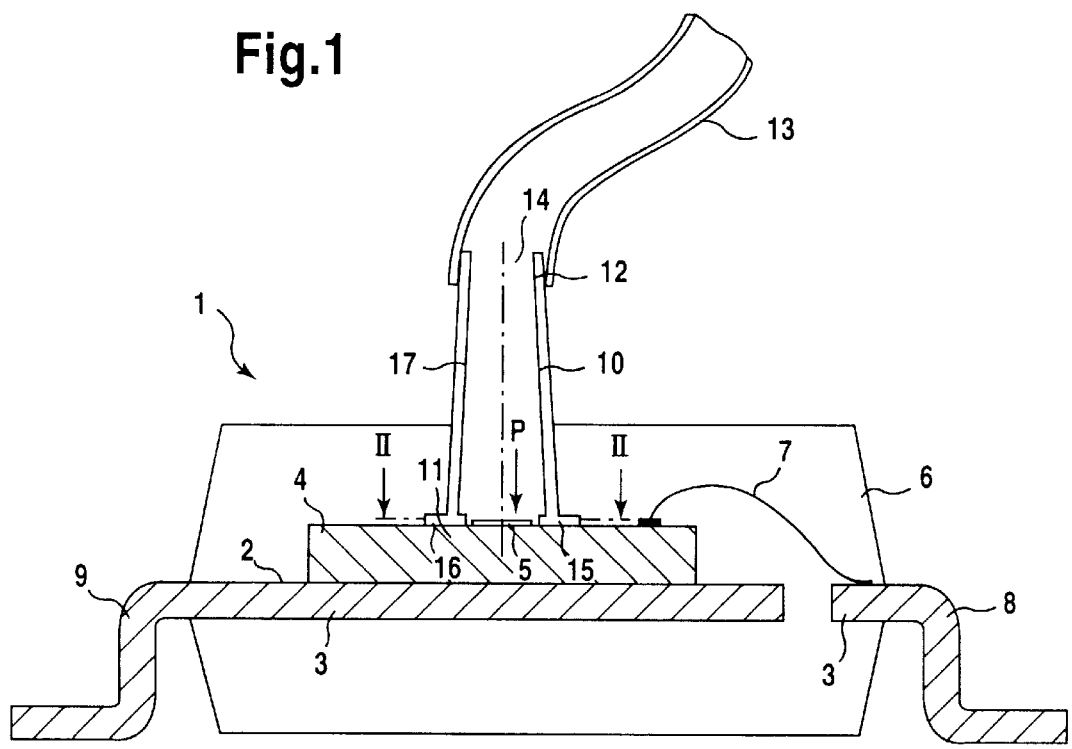
FIG. 1 is a diagrammatic sectional view of a pressure sensor component with a chimney-shaped connection piece in accordance with a preferred exemplary embodiment of the invention, cut along the section line I—I in FIG. 2.

Referring now to the figures of the drawing in detail and first, particularly, to FIG. 1 thereof, there is seen a pressure sensor component 1 according to the invention for surface mounting on the component-mounting area of a printed circuit board. The pressure sensor component 1 has a chip carrier 3 made of electrically conductive material and having an approximately planar chip carrier surface 2. On the chip carrier surface 2 there is fixed a semiconductor chip 4 made of silicon base material with a pressure sensor of integrated design and an electronic circuit assigned to the sensor. A pressure-detecting area 5 of the pressure sensor is exposed to a pressure P to be measured.

The pressure sensor component 1 is protected against external environmental influences by a component encapsulation 6 made of an electrically insulating material, for example a thermosetting plastic or thermoplastic material. The component encapsulation encloses the semiconductor chip 4 and/or the chip carrier 3 at least in regions. The chip carrier 3 is constructed in a conventional lead frame design, that is to say as a prefabricated chip carrier substrate. The lead frame has a multiplicity of electrode connections 8, 9 which penetrate through the component encapsulation 6 and are electrically connected via bonding wires 7 to the pressure sensor and to the electronic circuit of the semiconductor chip which is assigned to said sensor (only two electrode connections are illustrated in FIG. 1, the electrode connection 9, instead of a bonding wire, being electrically coupled directly to the underside of the semiconductor chip 4), which electrode connections are designed in the form of connection legs which are routed out to at least two sides of the chip carrier 3 and are bent and cut in a known manner to form short wing-shaped connection stubs. Such an arrangement ensures the mounting of the component 1 on the component-mounting surface of a printed circuit board using SMD technology.

Whereas, in the exemplary embodiment illustrated, a wire contact is employed for the electrical connection of the pressure sensor—integrated on the semiconductor chip 4—and of the electronic circuit assigned to the sensor to the electrode connections 8, 9, wherein bonding wires 7 are fixed on the chip 4 and drawn to the electrode leg 8 to be correspondingly connected, it is also possible, moreover, to use for the electrical connection so-called spider contacting. In spider contact-making, an electrically conductive lead frame plate is employed instead of bonding wires and the chip 4 is directly contacted on the lead frame plate.

The pressure sensor integrated on the silicon semiconductor chip 4 constitutes a so-called piezoresistive sensor in which provision is made of a thin silicon diaphragm which is produced in the surface of the chip 4 by micromechanical methods and is electrically coupled to pressure-dependent resistors which are likewise constructed in the silicon substrate and are connected in a bridge circuit in a conventional layout. A circuit assigned to the sensor is likewise integrated in the semiconductor chip 4. The circuit serves for signal conditioning (amplification and correction), but also for sensor calibration and compensation. In contrast to other designs, such semiconductor pressure sensors on which the invention is based are suitable principally for applications in which an extremely small structural size is important, that is to say, for example, in the case of pressure measurements in the automotive sector, for example in the context of measuring brake pressures, tire pressures, combustion chamber pressures and the like. In addition to semiconductor pressure sensors which operate according to the principle of piezoresistive pressure measurements, it is also possible, moreover, to use those which operate with capacitive measurement principles.

According to the invention, a chimney-shaped connection stub or connection piece 10 projects up relative to the pressure-detecting area 5 of the pressure sensor, penetrates through the encapsulation 6, as illustrated, and is connected to the pressure sensor. The connection piece 10 is arranged or incorporated in the component encapsulation 6 and encloses at least the pressure-detecting area 5 in a pressure-tight manner with its end 11 bearing on the semiconductor chip 4. The connection piece 10 is open toward the outside at its opposite end 12. In this way, the pressure P to be measured by means of a flexible pressure hose 13, which is placed onto the free end 12 of the connection piece, is passed via the opening 14 in the chimney-shaped connection piece 10 directly onto the pressure-detecting area 5 of the semiconductor chip 4. If required for a specific application, a thin photoresist film can be deposited on the pressure-detecting area 5. For shipping, the opening 14 may be temporarily covered with an adhesive strip of a removable cap, in order to avoid the ingress of impurities and contaminants.

Figure 2:
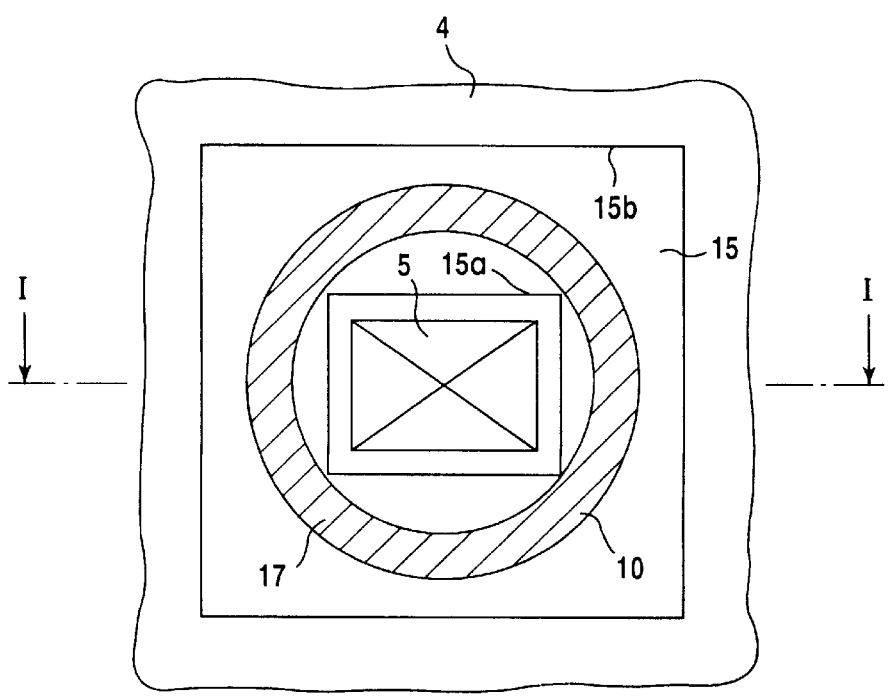
FIG. 2 is a partial plan view onto the pressure-detecting area of the pressure sensor, cut along the line II—II in FIG. 1.

The end 11 of the connection piece 10 that bears on the semiconductor chip is a square, flanged anchoring member 15. The member 15 surrounds the pressure-detecting area 5. The edge boundaries of the anchoring member 15 are designated by the reference numerals 15a and 15b in the plan view of FIG. 2. On the underside, the anchoring member 15 thus has an abutment area 16, which is supported on the semiconductor chip 4 and on which an adhesive or bonding agent may also be applied for the purpose of permanent fixing to the chip 4. The upwardly projecting part 17—penetrating through the encapsulation 6 and projecting above the structural height—of the chimney-shaped connection piece 10, which, in particular, is produced integrally and from a plastic material, has a circular, upwardly tapering cross-sectional form. The chimney-shaped part 17 may also be described as an inverted, conical funnel.

We claim:

1. A pressure sensor component, comprising:
   a chip carrier formed with a substantially planar chip carrier surface;
   a semiconductor chip disposed on said chip carrier surface, said semiconductor chip having an integrated pressure sensor with a pressure-detecting surface exposed to a pressure to be measured;
   an infected molded component encapsulation of electrically insulating material at least partly enclosing one of said semiconductor chip and said chip carrier, said encapsulation injected molded at least partly around said semiconductor chip and said chip carrier; and
   a chimney-shaped connection piece incorporated into said component encapsulation for exposing said pressure-detecting surface to the pressure to be measured, said connection piece having an end bearing on said semiconductor chip and pressure-tightly enclosing said pressure-detecting surface, projecting away from said pressure-detecting surface of said pressure sensor, and penetrating through said component encapsulation.

2. The pressure sensor component according to claim 1, wherein the pressure to be measured is passed via an opening formed in said chimney-shaped connection piece directly onto said pressure-detecting surface of said semiconductor chip.

3. The pressure sensor component according to claim 1, wherein said chimney-shaped connection piece is formed by a structural part independent from and incorporated in said component encapsulation.

4. The pressure sensor component according to claim 1, wherein said chimney-shaped connection piece is a one-piece plastic structure.

5. The pressure sensor component according to claim 1, wherein a segment of said chimney-shaped connection piece completely within said component encapsulation includes an anchoring member for absorbing tensile forces acting on said chimney-shaped connection piece.

6. The pressure sensor component according to claim 5, wherein said anchoring member is a shaped part formed laterally on and projecting transversely with respect to a longitudinal direction of said connection piece.

7. The pressure sensor component according to claim 5, wherein said anchoring member is a flange with a peripheral abutment area on an outer circumference of the end of said connection piece facing said semiconductor chip, said abutment area being supported on said semiconductor chip.

8. The pressure sensor component according to claim 1, wherein said connection piece has a free end with an opening projecting beyond a structural height of the component, said free end of said connection piece having a support for a positively locking mechanical, play-free connection to a holder of a pressure line adapted to be placed onto said connection piece, such that, when said pressure line is placed onto said connection piece, said holder and said support engage with one another.

9. The pressure sensor component according to claim 1, wherein said connection piece has an outwardly tapering cross-sectional form.

10. The pressure sensor component according to claim 1, wherein said connection piece is formed with a tubular attachment having a circular cross section and tapering conically toward a free end distal from said semiconductor chip, and with a baseplate at the end facing said semiconductor chip, said tubular attachment merging into said baseplate and said baseplate forming an anchoring member dimensioned and shaped to match said pressure-detecting surface of said semiconducter chip.

11. The pressure sensor component according to claim 1, wherein said chip carrier includes a plurality of surface-mountable electrode connections electrically connected to said pressure sensor and to an electronic circuit of said semiconductor chip assigned to said pressure sensor, said electrode connections penetrating through said component encapsulation.

* * * * *